July 20, 1954

C. BOLTICH 2,683,877

WELDING SHIELD

Filed Sept. 14, 1951

2 Sheets-Sheet 1

INVENTOR.
CHARLES BOLTICH
BY
Patrick D Beaver
ATTORNEY

July 20, 1954
C. BOLTICH
2,683,877
WELDING SHIELD
Filed Sept. 14, 1951
2 Sheets-Sheet 2
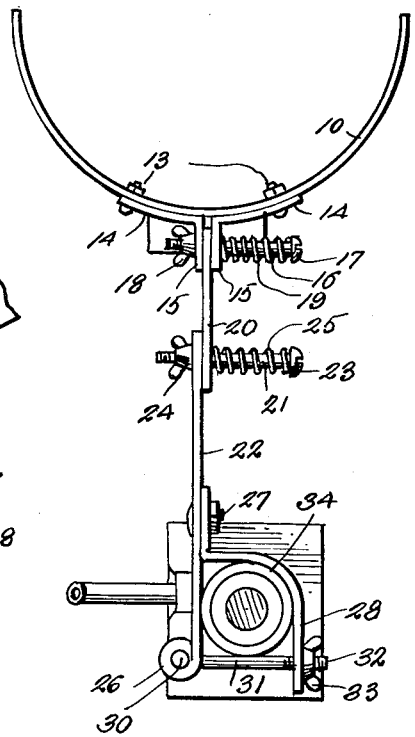
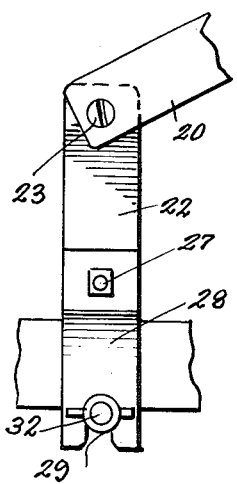
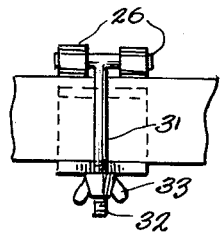
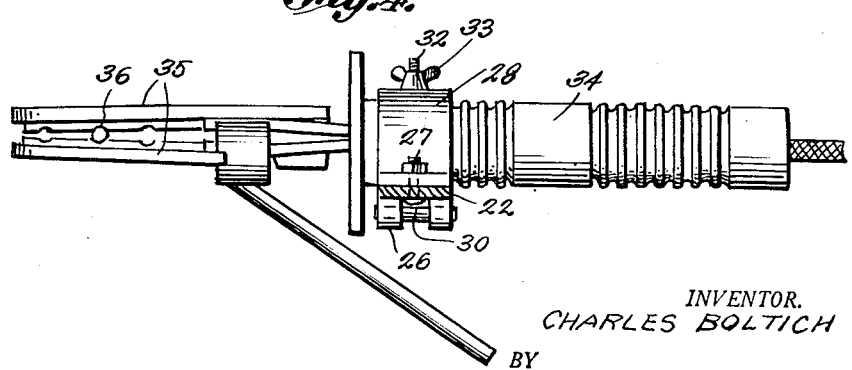
INVENTOR.
CHARLES BOLTICH
BY
Patrick D Beavers
ATTORNEY Patented July 20, 1954

2,683,877

UNITED STATES PATENT OFFICE 2,683,877

WELDING SHIELD

Charles Boltich, McKeesport, Pa.

Application September 14, 1951, Serial No. 246,628

1 Claim. (Cl. 2—11)

The present invention relates to a welding shield and it consists in the combinations, constructions and arrangements of parts herein described and claimed.

Generally there is provided a welding shield which is adapted to be attached to the conventional electrode holder of a welding apparatus and which is provided with means for adjusting the same radially with respect to the electrode holder and means for adjusting the shield itself with respect to a supporting arm attached adjustably to the holder. The construction and use of the device is such that it permits the welder one free hand at all times whereas with the conventional head shield or hand shield the welder is without the use of a free hand and hence in some jobs is confronted with the necessity of using a helper who would otherwise be unnecessary. Furthermore, since the present device is attached directly to the electrode holder, the user's head is free to observe in all normal directions thus providing a great safety factor over the conventional hand shield or head shield. By way of example, when tack welding with a head shield the welder has the electrode holder in one of his hands and with the other hand he must raise and lower his head shield. With the instant device one of his hands is free. Likewise, when leveling or squaring two pieces of steel to be welded and the welder is using a hand or head shield, he must have a helper since both of his hands are occupied with the shield and the electrode holder whereas with the present attachment the welder's free hand may be utilized for positioning the pieces of steel to be welded.

It is accordingly an object of the invention to provide a novel welding shield.

Another object of the invention is the provision, in a device of the character set forth, of a novel mounting forming a part of the invention.

Still another object of the invention is the provision, in a device of the character set forth, of novel means for adjusting the relative position of a shield with an electrode holder to which the same may be attached.

Figure 1:
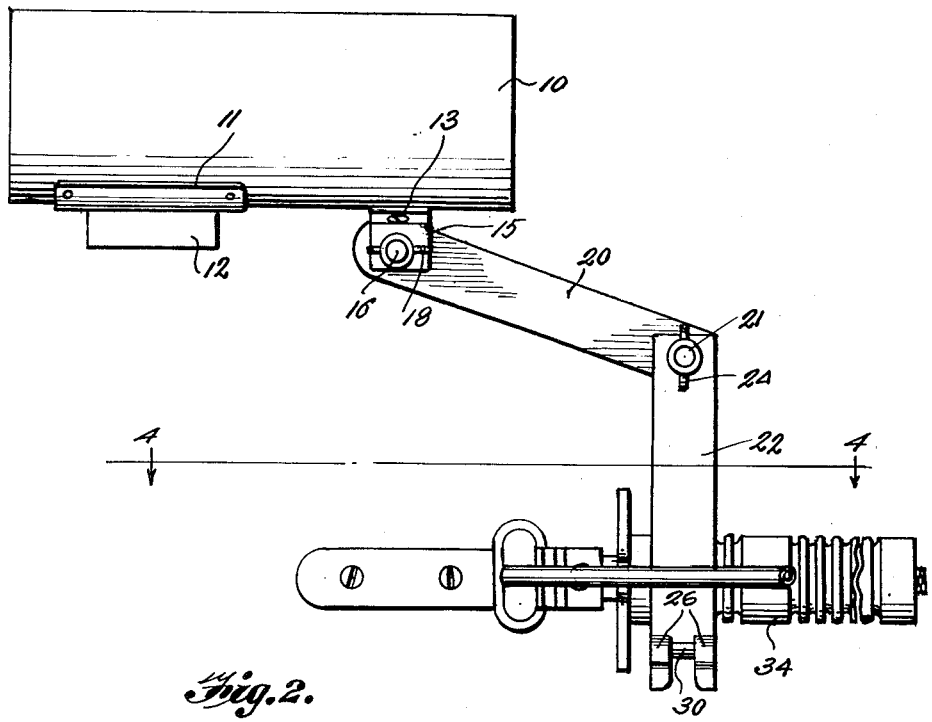
Figure 2:
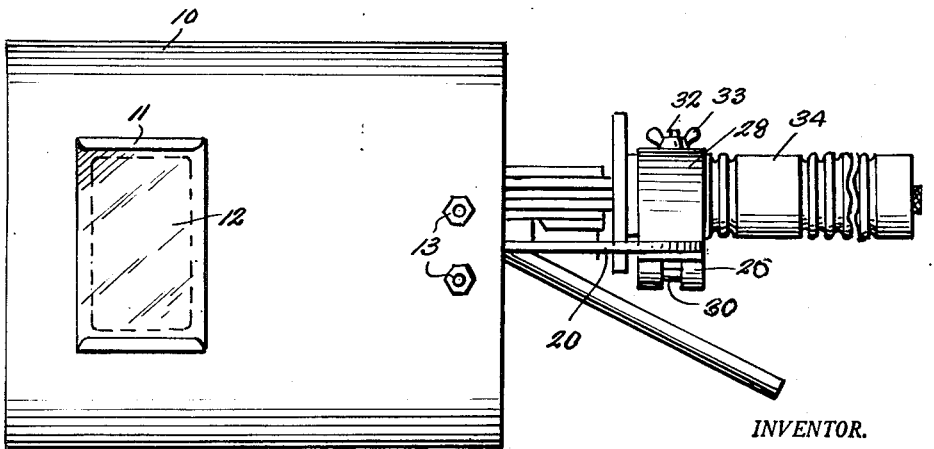

Other and further objects of the invention will become apparent from a reading of the following specification taken in conjunction with the drawings, in which:

Figure 1 is a side elevational view of an embodiment of the invention shown attached to an electrode holder, Figure 2 is a plan view of Figure 1, Figure 3 is a vertical sectional view of Figure 1, Figure 4 is a sectional view taken substantially along line 4—4 of Figure 1, Figure 5 is a fragmentary rear elevational view of Figure 1, and Figure 6 is a bottom plan view of Figure 5.

Referring more particularly to the drawings, there is shown therein a welder's shield 10 having a centrally positioned window frame 11 mounted therein and in which is, in turn, mounted a window 12 which is conventionally formed of colored glass.

Centrally affixed to the outer side of the shield 10 adjacent the inner edge thereof by means of bolts 13 or the like is a pair of arcuate bracket arms 14 each provided at its inner end with an outstanding ear 15. The ears 15 are in spaced parallel relation to each other and there extends therethrough a bolt 16 having a head 17 at one end and having threaded thereon at the other end a wing nut 18. A compression spring surrounds the bolt 16 and bears at one of its ends against the head 17 and at its other end against the adjacent ear 15.

Pivotally mounted adjacent one of its ends upon the bolt 16 between the ears 15 is a link 20 whose other end is pivotally connected by means of a bolt 21 to the upper end of an arm 22. The bolt 21 is provided at one end with a head 23 and has threaded upon its other end a wing nut 24. A compression spring 25 surrounds the bolt 21 and bears against the head 23 at one end and against the link 20 at its other end.

The lower end of the arm 22 terminates in an interrupted cylindrical portion 26 and adjacent the lower end of the arm 22 there is affixed by means of a bolt 27 or the like an outwardly and downwardly extending clamp arm 28 which is bifurcated, as indicated at 29, at its lower end.

Revolubly mounted in the cylindrical portion 26 is an axle 30 having centrally affixed thereto a cylindrical latch arm 31 which is threaded, as indicated at 32, at its outer end to threadably receive thereon a wing nut 33.

At 34 is shown the handle portion of an electrode holder provided with the conventional electrode clamps 35 for an electrode 36.

In operation, it will be apparent that the device may be attached to the handle 34 by placing the lower end of the arm 22 upon one side of the handle 34 while the clamp arm 28 encompasses the other side. Thereupon the clamp arm 31 is revolved upon its axle 30 until its free end extends into the bifurcated portion 29 whereupon the wing nut 33 may be screwed inwardly to securely clamp the arm 22 in position upon the handle 34. Thereafter whenever it is desired to adjust the device radially with respect to the arm 34, the nut 33 may be loosened and the arm 22 moved radially with respect to the handle 34. Adjustment of the shield 10 toward and away from the user's head may be effectuated by merely moving the shield to any desired position since the link 20 is yieldably and frictionally connected to the ear 15 and likewise connected to the upper end of the arm 22. It will also be seen that the tension of the springs 19 and 25 may be adjusted to whatever tension is desired by manipulating the wing nuts 18 and 24. Thus the shield 10 may be placed in any desired useful position with respect to the eyes of the operator and it will also be apparent that the device needs no further attention when once it is adjusted and that it is carried and supported by the handle 34 of the welding device itself and hence needs no manipulation by the operator's hand which is not engaged in holding the handle 34.

While but one form of the invention has been shown and described herein, it will be readily apparent to those skilled in the art that many minor modifications may be made without departing from the spirit of the invention or the scope of the appended claim.

What is claimed is:

A device of the character described comprising a welder's shield, a pair of ears attached to the lower forward side of said shield, an arm, clamp means for fixedly attaching the outer portion of said arm to an electrode holder, and a link pivotally connected at one of its ends to said ears and pivotally connected at its other end to the inner end of said arm, said pivotal connections each consisting of a headed bolt extending through the parts connected, a wing nut for each bolt, and a compression spring surrounding each bolt and bearing against the head thereof and against the parts connected thereby.

References Cited in the file of this patent

UNITED STATES PATENTS

| Number | Name | Date |
|---|---|---|
| 1,421,467 | Harden | July 4, 1922 |
| 1,509,022 | Noble | Sept. 16, 1924 |
| 2,235,594 | Smith | Mar. 18, 1941 |

FOREIGN PATENTS

| Number | Country | Date |
|---|---|---|
| 34,364 | Netherlands | Nov. 17, 1934 |
| 129,177 | Great Britain | July 10, 1919 |